June 28, 1960
B. J. DUNCAN
2,943,274
MICROWAVE ISOLATOR
Filed July 10, 1956
2 Sheets-Sheet 2
*a*
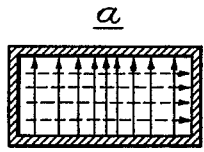
*b*
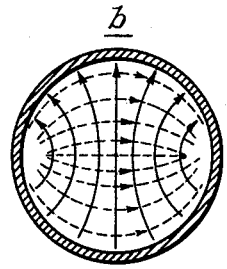
*c*
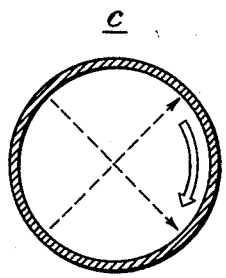
*d*
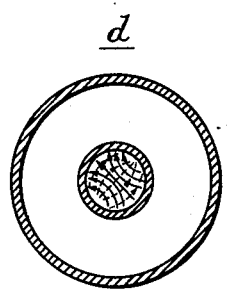
*e*
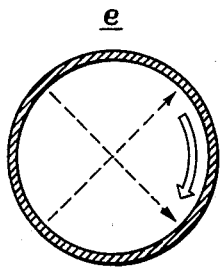
*f*
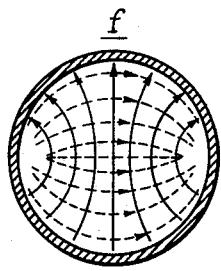
*g*
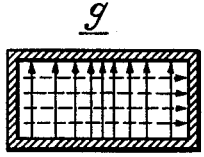
*h*
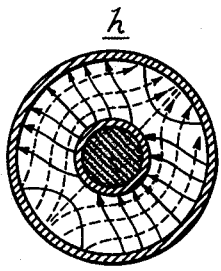
Fig. 4
INVENTOR
BOBBY J. DUNCAN
BY
ATTORNEY United States Patent Office 2,943,274
Patented June 28, 1960

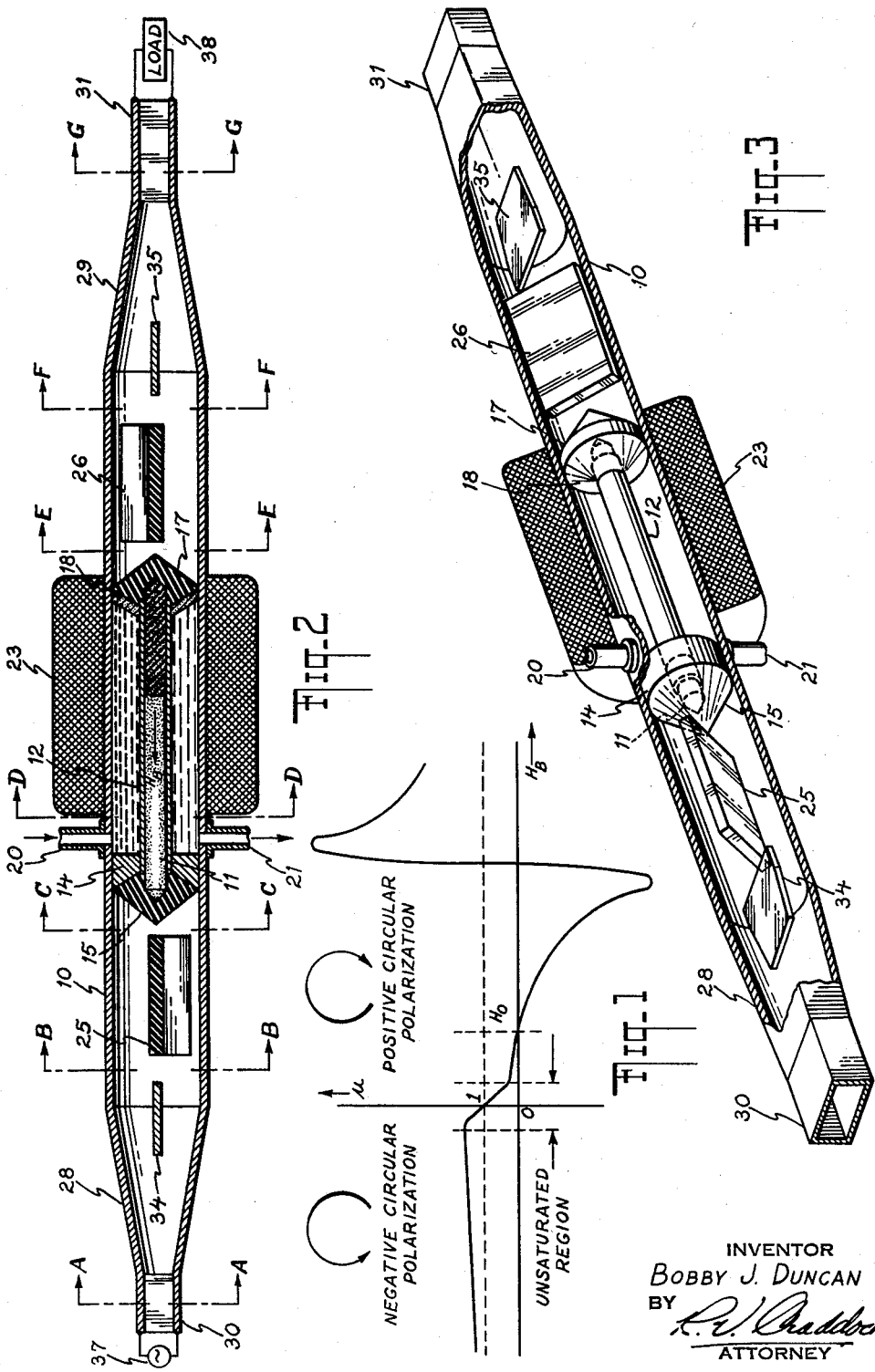

2,943,274
MICROWAVE ISOLATOR

Bobby J. Duncan, Port Washington, N.Y., assignor to Sperry Rand Corporation, a corporation of Delaware Filed July 10, 1956, Ser. No. 596,907

3 Claims. (Cl. 333—24)

This invention relates to microwave transducers and more particularly to non-reciprocal microwave transducers, such as isolators.

A non-reciprocal transducer is a device having an energy transfer function dependent on the direction of energy passage therethrough. An isolator is a non-reciprocal transducer which freely transfers energy in one direction, but prohibits passage of energy in the reverse direction. Isolators are employed, for example, in microwave transmission systems to prevent transmitting devices, such as klystrons and magnetrons, from receiving waves reflected from loads, such as antennas.

A load connected to a transmission means, such as a waveguide, does not present a perfect match to incident electromagnetic waves and, consequently, a portion of these waves will be reflected at the juncture. The combination of an incident and a reflected electromagnetic wave on a transmission means creates standing waves. The effect of such standing waves is to present to the transmitting device an impedance which is not the characteristic impedance of the transmission means. Any change in the load, such as occurs in a scanning radar, will be reflected to the transmitting device as a varying impedance. This varying impedance seen by the transmitting device will not only result in a variable amount of power being delivered to the load, but may also result in "pulling" of the transmitting device; that is, its frequency will change. It is the function of an isolator to prevent the reflected wave from reaching the transmitting device, but to freely permit passage of the incident wave. This may be accomplished by providing a non-reciprocal attenuator; that is, by attenuating the reflected wave and allowing the incident wave to pass unattenuated. In this way the transmitting device sees only the characteristic impedance of the transmission means regardless of changes in the load.

One way in which isolation has been accomplished is described in U.S. patent application Serial No. 551,872, filed December 8, 1955, by B. J. Duncan, assigned to the same assignee as the instant invention. A ferrite member disposed within a section of waveguide employs a hollow structure, the hollow portion being filled with a lossy material. A source of magnetomotive force produces a magnetic field for immersing the ferrite member. The value of magnetic field employed is that value which will magnetically bias the ferrite to zero effective permeability for the incident electromagnetic wave. The incident wave will be substantially excluded from the ferrite member and will propagate past it substantially unattenuated. However, as the ferrite member presents a finite permeability to the reflected wave, this wave will pass through the ferrite member and be attenuated therein. This device performs very well as an isolator at relatively low and medium microwave powers. Its ability to handle high microwave powers is somewhat limited because the reflected wave is entirely dissipated within the ferrite member.

It is therefore the principal object of this invention to provide an improved isolator capable of handling high values of microwave power.

It is a further object of this invention to provide a microwave isolator in which the heat generated by the dissipated wave is easily removed.

It is a further object of this invention to provide a ferrite isolator in which a coolant may be circulated about the ferrite member.

It is a further object of this invention to provide an isolator in which the reflected wave is dissipated in a circulating coolant.

It is a further object of this invention to provide a ferrite isolator in which a circulating coolant is employed both for removing heat from the ferrite member and for dissipating the reflected wave.

In accordance with the present invention, a cylindrical ferrite member is magnetically biased to zero effective permeability for positively rotating circularly polarized waves. The ferrite member is coaxially disposed within a circular waveguide section, and surrounded by a conductive shell. A lossy coolant is circulated between the shell and the inner surface of the circular waveguide section. The incident wave, rotating in the negative sense, passes through the ferrite member in a dielectric waveguide mode. The reflected wave, rotating in the positive sense, is rejected by the ferrite member, and passes around the ferrite member and conductive shell and through the coolant where it is dissipated. By thus dissipating the reflected wave in a circulating coolant, which also removes heat from the ferrite member, this isolator is capable of dissipating high microwave powers.

The present invention will be described with reference to the following drawings, wherein:

Fig. 1 is a graph of the real part of the effective permeability for ferrites as a function of applied magnetic field;

Fig. 2 is an elevational view, partly in cross-section, of the isolator of this invention;

Fig. 3 is a perspective view, partly in cross-section, of the device of Fig. 2;

Fig. 4 is a series of drawings of the electromagnetic field configuration at various points in the isolator of Fig. 2.

Ferrites can be described as polycrystalline materials of spinel structure which are formed at high temperature by the solid-phase reactions of iron oxide and one or more divalent metallic oxides. By varying the ingredients and the processing techniques, wide ranges in the general properties of ferrites can be obtained. Ferrites in their simplest form correspond to the general chemical formula $XOFe_2O_3$, where X represents the divalent metal. Ferrites represented by the above general formula fall into two main classes; those which are ferromagnetic and those which are not. Whether a ferrite falls into one or the other of these classes depends on the divalent metallic oxide used. For example, those ferrites in which X is magnesium, copper, manganese, lithium, nickel, lead, iron, calcium or cobalt are ferromagnetic. The ferromagnetic ferrites are ceramic-like materials characterized by low conductivity, low losses, and high permittivity.

It is well known that the R.-F. permeability of a saturated ferromagnetic material is not a scalar quantity, but instead the alternating flux density in the medium is related to the alternating field by a tensor permeability. The tensor components of the permeability are complex quantities. This unique tensor permeability is the property of ferrites that makes them useful for non-reciprocal devices.

Oppositely rotating circularly polarized magnetic field components of electromagnetic waves encounter different propagation constants in a ferrite due to its tensor permeability. The component permeabilities, which are complex quantities, encountered by the two circularly polarized components depend on the material, the frequency of the wave, and the strength of the applied magnetic field. The rear part of the permeability presented to the circularly polarized magnetic field component by a ferromagnetic ferrite which is magnetized perpendicularly to the plane of rotation of the magnetic field component is shown in Fig. 1 as a function of the biasing magnetic field intensity $H_B$. This curve will be similar for different ferrites and different frequencies and will differ only in magnitude and the positions of critical points.

The propagation constant of an electromagnetic wave in a medium is proportional to the factor $(\mu\epsilon)^{1/2}$, where $\mu$ is the permeability and $\epsilon$ the permittivity of the medium. If the permeability encountered by a wave is zero, the propagation constant does not exist and the wave will not propagate in the medium. In such a case a wave will be substantially excluded from the medium and will not penetrate into the medium. Thus, the medium will act similarly to a conductor.

Referring once more to Fig. 1, it may be noted that for a given material two values of biasing magnetic field exist for which the real part of the permeability is zero for the positively rotating magnetic field component of the wave. The lesser of these two magnetic field values is designated $H_0$ and is the preferred operating point. Using the lesser value, $H_0$, of the field, adjustment of the biasing field is less critical and the source of field may be smaller. Furthermore, it has been shown that a ferrite so biased will exhibit zero permeability for a broad range of frequencies. If the imaginary part of the permeability is very small when the real part is zero, the total effective permeability is practically zero and the positively rotating waves will not propagate in the medium. On the other hand, with this value of biasing magnetic field, the permeability is finite for the negatively rotating magnetic field component, and this wave component will propagate through the ferrite. Many ferrites exhibit both a low imaginary part and a zero real part of the permeability for waves of one sense of rotation at certain frequencies. In particular, magnesium-manganese ferrites, nickel-zinc ferrites, and many nickel ferrites display this characteristic. The commercially available Ferramic R-1 product of the General Ceramics Corporation has this type of permeability.

The preferred embodiment of the isolator of this invention, shown in Figs. 2 and 3, includes a circular waveguide section 10 having coaxially disposed therein a cylindrical ferrite rod 11. Ferrite rod 11 is tapered at each end to effect wave matching properties. Surrounding ferrite rod 11 and coaxially disposed therewith is a conductive shell 12 composed of a material such as brass or copper. The cylindrical surface of ferrite rod 11 is somewhat longer than shell 12, in order that the rod may readily interact with electromagnetic waves traveling through the waveguide section in each direction. A tapered conductive member 14 is disposed between shell 12 and the inner surface of waveguide section 10 near one end of said shell and serves to help support ferrite rod 11 and shell 12 within waveguide section 10. A tapered dielectric member 15 is disposed adjacent conductive member 14. A tapered dielectric member 17 is disposed between shell 12 and the inner surface of waveguide section 10 near the other end of said shell and serves to help support ferrite rod 11 and shell 12. Both conductive member 14 and dielectric member 17 are sealed to shell 12 and the inner surfaces of waveguide section 10 in a fluid-tight manner. A conical dissipative member 18 is disposed adjacent dielectric member 17 and between shell 12 and the inner surface of waveguide section 10. Conduits 20 and 21 in the wall of waveguide section 10 serve to direct a fluid coolant through the chamber defined by shell 12, the inner surface of waveguide section 10, conductive member 14, and dissipative member 18. A source of biasing magnetic field, such as a solenoid 23, surrounds waveguide section 10 and supplies an axially directed biasing magnetic field $H_B$ for ferrite rod 11.

A pair of circular polarizes 25 and 26, disposed within waveguide section 10 opposite each end of ferrite rod 11, serve to convert linearly polarized waves to circularly polarized waves and vice versa. Such devices may take the form of conductive or dielectric quarter wavelength plates. In the instant invention quarter wavelength dielectirc plates are illustrated. A pair of circular-to-rectangular waveguide transitions 28 and 29 connect circular waveguide section 10 to a pair of rectangular waveguide sections 30 and 31. A pair of conductive plates 34 and 35, oriented parallel to the broad walls of rectangular waveguide sections 30 and 31, are disposed in respective transittions 28 and 29. The planes of circular polarizers 25 and 26 are rotated 45° from the planes of conductive plates 34 and 35.

To clarify the ensuing explanation of the operation of this device, the following definitions are adopted:

*Clockwise rotation.*—The rotation of a wave which appears to turn in a clockwise manner when viewed in the direction of propagation of the wave.

*Counter-clockwise rotation.*—The rotation of a wave which appears to turn in a counter-clockwise manner when viewed in the direction of propagation of the wave.

*Positive rotation.*—Rotation in the direction of the positive electric current which creates a steady longitudinal magnetic field.

*Negative rotation.*—Rotation in the direction opposite the positive electric current which creates a steady longitudinal magnetic field.

The operation of this invention may be more readily understood by considering the drawings of the electromagnetic field configurations of Fig. 4 in conjunction with the structure of Figs. 2 and 3. All of the drawings of Fig. 4 are illustrated looking toward the right in Fig. 2. The solid lines represent the electric field and the dotted lines represent the magnetic field. A transmitting device 37 launches a linearly polarized $TE_{10}$ wave, the dominant mode for rectangular waveguide, into rectangular waveguide section 30. The field configuration in waveguide section 30 is shown in Fig. 4a, which is a cross-section of Fig. 2 at section A—A. This wave propagates to the right in the figure and is coupled through transition 28 into circular waveguide section 10, where the field configuration becomes that of the linearly polarized $TE_{11}$ mode, the dominant mode for circular waveguide, shown in Fig. 4b, at section B—B. Plate 34 insures that the electric field polarization in circular waveguide section 10 will be perpendicular to the extended broad walls of the rectangular waveguide sections. The wave of Fig. 4b continues toward the right and through circular polarizer 25, where it is converted to a clockwise rotating circularly polarized $TE_{11}$ wave. The magnetic field component of this rotating wave is shown in Fig. 4c at section C—C.

The clockwise rotating wave is rotating in the negative sense with respect to the biasing magnetic field $H_B$ applied to ferrite rod 11. Consequently, to this wave ferrite rod 11 acts as a dielectric member. Conductive member 14 and dielectric member 15 serve to guide this wave into ferrite rod 11. Ferrite rod 11, when surrounded by conductive shell 12, acts as a dielectric-filled waveguide for the wave propagating to the right. As the cutoff diameter for a dielectric-filled waveguide is very much smaller than that for an air-filled waveguide, the wave will propagate toward the right inside shell 12.

One component of the circularly polarized field for this wave is shown in Fig. 4d, at section D—D. For best propagation without mismatch, the diameter $d'$ of the dielectric-filled waveguide should be related to the diameter $d$ of the air-filled waveguide according to the following equation:

$$\frac{d'}{d} = \frac{1}{(\mu_r \epsilon_r)^{1/2}}$$

where $\mu_r$ is the relative permeability and $\epsilon_r$ is the relative permittivity of the dielectric-filled waveguide. Owing to the presence of conductive member 14 and shell 12 no portion of the wave can propagate to the right external to shell 12.

The wave leaves ferrite rod 11 and reenters waveguide section 10 through dielectric member 17. If ferrite rod 11 is a low loss type this wave will be substantially unattenuated. This wave is shown in Fig. 4e, at section E—E. The clockwise rotating wave enters circular polarizer 26 where it is reconverted to a linearly polarized wave, as shown in Fig. 4f, at section F—F. The wave continues to the right, traveling through transition 29 to waveguide section 31 (Fig. 4g), where it is delivered to a load 38.

Load 38 does not present a perfect match to waveguide section 31 and consequently waves traveling to the right in waveguide section 31 will be partially reflected. The resulting reflected waves propagate to the left through waveguide section 31 and transition 29. This wave passes to the left through circular polarizer 26, where it is converted to a clockwise rotating circularly polarized wave, and continues to the left in waveguide section 10. As the wave is traveling in the opposite direction from that shown in Fig. 4e it will rotate in the opposite direction from the wave shown in Fig. 4e. Consequently the wave will be rotating in the positive sense with respect to the biasing magnetic field. The value of the biasing magnetic field is that required for the ferrite member to exhibit zero effective permeability for a positively rotating wave. Therefore, the positive rotating reflected wave cannot propagate in the zero permeability medium and will be substantially excluded therefrom. The wave will be unable to penetrate rod 11, but instead will pass around it and enter the region between conductive shell 12 and waveguide section 10 after traveling through dielectric member 17 and dissipative member 18. Between shell 12 and waveguide section 10 each component of the circularly polarized wave will propagate in the coaxial line $TE_{11}$ mode, as shown in Fig. 4h, at section D—D. If a dissipative material fills the space between shell 12 and waveguide section 10, the wave will be rapidly attenuated. If the wave is not completely dissipated in its travel through this coaxial space, it will be reflected from conductive member 14 and be further attenuated as it travels back to the right. For best results, lossy fluid should be circulated through this coaxial space by means of conduits 20 and 21. This fluid will serve not only to dissipate the reflected wave but will also act as a coolant to carry away heat which may be produced due to any losses in ferrite rod 11. Ordinary tap water is usually found to be a sufficiently dissipative coolant for this purpose.

Dielectric member 15 serves to match the dielectric waveguide comprising shell 12 and ferrite rod 11 to waveguide section 10 for negatively rotating waves traveling to the right. Shell 12 not only serves as the conductive member of a dielectric-filled waveguide, but prevents any portion of the incident wave from traveling through the lossy coolant. Dielectric member 17 serves to match waveguide section 10 to the dielectric-filled waveguide for negatively rotating waves traveling to the right. Dissipative member 18 in cooperation with dielectric member 17 serves to match the effective coaxial line section, comprising shell 12, waveguide section 10, and its lossy coolant interior, to waveguide section 10 for positively rotating waves traveling to the left.

Thus, extremely high powers of reflected waves may be handled by this device without causing the ferrite rod to rise to a temperature which may either destroy it or seriously hamper its operation.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. An isolator comprising a section of circular waveguide adapted to propagate electromagnetic waves at a given frequency, means coupled to one end of said waveguide for launching therein positively rotating circularly polarized waves at said frequency and means coupled to the opposite end of said waveguide section for launching therein negatively rotating circularly polarized waves at said frequency, a longitudinally magnetized ferrite element disposed parallel to the longitudinal axis of said waveguide section and filling only a portion of the transverse cross-section of said waveguide section, said element presenting zero effective permeability only to said positively rotating circularly polarized waves and being permeable and substantially lossless to said negatively rotating circularly polarized waves, a conductive shell surrounding said element, a material dissipative to electromagnetic waves disposed between said shell and the inner surface of said waveguide section, the diameter of said ferrite element and its permittivity and its permeability to said negatively rotating circularly polarized waves being proportioned to provide dielectric waveguide means for said negatively rotating circularly polarized waves, whereby said negatively rotating circularly polarized waves propagate through said element substantially unattenuated and said positively rotating circularly polarized waves propagate substantially only between said conductive shell and the inner surface of said waveguide and are attenuated by said dissipative material.

2. An isolator comprising a section of circular waveguide, a cylindrical ferrite rod coaxially disposed within said waveguide section and filling only a portion of the transverse cross-section of said waveguide section, said ferrite rod being substantially lossless to electromagnetic waves at a given frequency and being magnetized in a direction parallel to the longitudinal axis of said waveguide section to zero effective permeability for positively rotating circularly polarized waves, means for launching positively rotating circularly polarized waves at said given frequency into one end of said waveguide section and means for launching negatively rotating circularly polarized waves at said given frequency into the opposite end of said waveguide section, a conductive cylindrical shell surrounding said ferrite rod and coaxially disposed therewith, said ferrite rod being longer than said shell whereby a portion of said rod extends beyond each end of said shell, said ferrite rod having a diameter of sufficient dimension for propagating said negatively rotating circularly polarized waves therethrough in a dielectric mode, and a material lossy to electromagnetic waves disposed between said shell and the inner surface of said waveguide section, whereby said negatively rotating circularly polarized waves propagate through said ferrite rod substantially unattenuated and said positively rotating circularly polarized waves propagate only between said cylindrical shell and the inner surface of said waveguide and are attenuated by said lossy material.

3. An isolator comprising a section of circular waveguide adapted to propagate electromagnetic waves at a given frequency, means coupled to one end of said waveguide for launching therein positively rotating circularly polarized waves at said frequency and means coupled to the opposite end of said waveguide for launching therein negatively rotating circularly polarized waves at said frequency, a longitudinally magnetized ferrite member disposed parallel to the longitudinal axis of said waveguide section and filling only a portion of the transverse cross-section of said waveguide section, said member presenting zero effective permeability only to said positively rotating circularly polarized waves and being permeable and substantially lossless to said negatively rotating circularly polarized waves, a conductive shell surrounding said member, the diameter of said member and its permeability and its permittivity to said negatively rotating circularly polarized waves being proportioned to provide dielectric waveguide means for said negatively rotating circularly polarized waves, a dielectric member disposed between said shell and the inner surface of said circular waveguide section near said opposite end of said waveguide section, a conductive member disposed between said shell and the inner surface of the circular waveguide near said one end of the waveguide section, said dielectric member and said conductive member being secured to the shell and the waveguide in a fluid-tight manner whereby a fluid-tight chamber is formed, and means for circulating through said chamber a fluid coolant which is dissipative to electromagnetic waves at said given frequency.

References Cited in the file of this patent

UNITED STATES PATENTS

| | | |
|---|---|---|
| 2,197,123 | King | Apr. 16, 1940 |
| 2,748,353 | Hogan | May 29, 1956 |
| 2,752,572 | Bird et al. | June 26, 1956 |
| 2,798,205 | Hogan | July 2, 1957 |
| 2,802,184 | Fox | Aug. 6, 1957 |
| 2,849,683 | Miller | Aug. 26, 1958 |
| 2,850,702 | White | Sept. 2, 1958 |
| 2,870,418 | Hewitt | Jan. 20, 1959 |

OTHER REFERENCES

Melchor et al.: Journal of Applied Physics, vol. 27, No. 1, Jan. 1956, pages 72–77. Copy in Scientific Library.

Measurement of the Microwave Properties of Ferrites at High Power Levels, United States Department of Commerce, Office of Technical Services, PB 1118 26, received in Patent Office June 26, 1956.